United States Patent
Itokazu

(10) Patent No.: US 11,639,759 B2
(45) Date of Patent: May 2, 2023

(54) WIRING MEMBER SUPPORT DEVICE

(71) Applicant: Fanuc Corporation, Yamanashi (JP)

(72) Inventor: Kenta Itokazu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 55 days.

(21) Appl. No.: 16/998,968

(22) Filed: Aug. 20, 2020

(65) Prior Publication Data
US 2021/0088157 A1 Mar. 25, 2021

(30) Foreign Application Priority Data

Sep. 24, 2019 (JP) .............................. JP2019-172960

(51) Int. Cl.
*F16L 3/015* (2006.01)
*F16L 3/12* (2006.01)
*F16M 13/02* (2006.01)

(52) U.S. Cl.
CPC ............. *F16L 3/015* (2013.01); *F16L 3/1207* (2013.01); *F16M 13/02* (2013.01)

(58) Field of Classification Search
CPC ....... F16L 3/3223; F16L 3/2235; F16L 3/015; F16L 3/1207; F16M 13/02
See application file for complete search history.

(56) References Cited

U.S. PATENT DOCUMENTS

| | | | | |
|---|---|---|---|---|
| 2,227,528 | A * | 1/1941 | Adler ..................... | F16L 3/2235 174/157 |
| 2,288,158 | A * | 6/1942 | Ray ....................... | F16L 3/2235 174/157 |
| 2,362,124 | A * | 11/1944 | Ray ....................... | F16L 55/035 174/157 |
| 4,304,077 | A * | 12/1981 | Muller ................... | F16L 3/2235 248/68.1 |
| 4,705,243 | A * | 11/1987 | Hartmann ............ | B25J 19/0025 248/51 |

(Continued)

FOREIGN PATENT DOCUMENTS

| | | |
|---|---|---|
| JP | H08-197482 A | 8/1996 |
| JP | 2009-220220 A | 10/2009 |

(Continued)

*Primary Examiner* — Eret C McNichols
(74) *Attorney, Agent, or Firm* — Shackelford, Bowen, McKinley & Norton, LLP

(57) ABSTRACT

Wiring member support device supports a movable section of a wiring member provided across two link members supported to be rotatable about a predetermined axis, the movable section capable of moving in accordance with relative rotation of the link members, the wiring member support device including, two or more support pieces provided with at least one guide hole through which an intermediate position of the movable section of the wiring member in the longitudinal direction passes and which has an inner diameter slightly greater than an outer diameter of the wiring member, the two or more support pieces connected to be detachable from each other at the position of the guide hole in a radial direction of the guide hole. The wiring member support device is fixed to the link member at a position between a fixed position of the wiring member to the link member and the predetermined axis.

7 Claims, 9 Drawing Sheets

(56) References Cited

U.S. PATENT DOCUMENTS

| | | | | |
|---|---|---|---|---|
| 4,775,286 A * | 10/1988 | Gillette | | E02F 9/2275 |
| | | | | 280/421 |
| 5,108,253 A * | 4/1992 | Kobayashi | | E02F 9/2271 |
| | | | | 414/694 |
| 5,226,892 A * | 7/1993 | Boswell | | A61M 5/1418 |
| | | | | 24/616 |
| 5,257,768 A * | 11/1993 | Juenemann | | F16L 55/035 |
| | | | | 248/68.1 |
| 5,931,423 A * | 8/1999 | Heideloff | | F16L 3/2235 |
| | | | | 248/219.3 |
| 5,996,945 A * | 12/1999 | Coles | | F16L 3/2235 |
| | | | | 248/68.1 |
| 6,053,456 A * | 4/2000 | Dispenza | | F16L 5/14 |
| | | | | 248/68.1 |
| 6,173,926 B1 * | 1/2001 | Elvegaard | | F16L 3/1075 |
| | | | | 248/68.1 |
| 6,561,466 B1 * | 5/2003 | Myers | | F16L 3/221 |
| | | | | 248/68.1 |
| 6,783,101 B2 * | 8/2004 | Knotts | | F16L 3/2235 |
| | | | | 248/74.1 |
| 7,922,012 B2 * | 4/2011 | Sisley | | H02G 3/0406 |
| | | | | 248/74.1 |
| 8,348,204 B2 * | 1/2013 | Kataoka | | B61D 49/00 |
| | | | | 248/68.1 |
| 9,216,479 B2 * | 12/2015 | Takahashi | | B25J 19/0025 |
| 9,233,475 B2 * | 1/2016 | Kume | | F16L 3/22 |
| 9,382,685 B2 * | 7/2016 | Maki | | E02F 9/14 |
| 9,388,552 B2 * | 7/2016 | Okunishi | | F16L 3/01 |
| 9,400,066 B2 * | 7/2016 | Barre | | F16L 3/2235 |
| 9,469,964 B2 * | 10/2016 | Nakamura | | E02F 3/36 |
| 9,863,556 B2 * | 1/2018 | Robert, Jr. | | F16L 3/2235 |
| 9,920,858 B2 * | 3/2018 | Harnetiaux | | F16L 3/223 |
| 10,302,228 B2 * | 5/2019 | Costigan | | H02G 3/30 |
| 10,309,553 B1 * | 6/2019 | Schwalbe | | E02F 9/2275 |
| 10,408,365 B2 * | 9/2019 | McCarter | | F16L 3/222 |
| 10,632,594 B2 * | 4/2020 | Short | | F16L 3/16 |
| 10,814,500 B2 * | 10/2020 | Adachi | | H02G 11/02 |
| 10,865,912 B2 * | 12/2020 | Bechtold | | H02G 3/32 |
| 10,975,988 B2 * | 4/2021 | Pieske | | F16L 55/035 |
| 11,092,261 B2 * | 8/2021 | Bickert | | F16L 3/2235 |
| 2007/0120023 A1 * | 5/2007 | Martinez | | F16L 3/22 |
| | | | | 248/68.1 |
| 2010/0123048 A1 * | 5/2010 | Pollard, Jr. | | F16L 3/2235 |
| | | | | 248/49 |
| 2012/0067157 A1 * | 3/2012 | Suzuki | | B25J 19/0025 |
| | | | | 901/29 |
| 2012/0111135 A1 * | 5/2012 | Ichibangase | | B25J 19/0025 |
| | | | | 901/29 |
| 2014/0003901 A1 * | 1/2014 | Takagi | | E02F 3/30 |
| | | | | 414/687 |
| 2014/0013893 A1 * | 1/2014 | Asano | | B25J 19/0025 |
| | | | | 901/27 |
| 2014/0332249 A1 * | 11/2014 | Barna | | H02G 3/32 |
| | | | | 174/665 |
| 2015/0222106 A1 * | 8/2015 | Caspari | | F03D 80/80 |
| | | | | 174/651 |
| 2015/0247591 A1 * | 9/2015 | Goldwin | | F16H 31/002 |
| | | | | 248/67.5 |
| 2017/0009909 A1 * | 1/2017 | Robert, Jr. | | F16L 3/1091 |
| 2017/0030487 A1 * | 2/2017 | Sampson | | F16L 55/035 |
| 2018/0080579 A1 * | 3/2018 | Costigan | | F16L 3/1075 |
| 2018/0320800 A1 * | 11/2018 | Pieske | | F16L 3/1207 |
| 2019/0039747 A1 * | 2/2019 | Gilbertson | | F16L 3/237 |
| 2019/0260144 A1 * | 8/2019 | Pfeiffer-Wagner | | H01R 41/00 |
| 2020/0040545 A1 * | 2/2020 | Maki | | E21C 47/00 |
| 2021/0088157 A1 * | 3/2021 | Itokazu | | H02G 3/32 |
| 2021/0091553 A1 * | 3/2021 | St-Cyr | | H02G 11/00 |
| 2021/0095791 A1 * | 4/2021 | Jokinen | | F16L 3/237 |

FOREIGN PATENT DOCUMENTS

| | | | | |
|---|---|---|---|---|
| JP | 2009-220221 A | | 10/2009 | |
| JP | 2012-100470 A | | 5/2012 | |
| JP | 2018-140456 A | | 9/2018 | |
| KR | 2011006781 U | * | 7/2011 | B61C 17/00 |
| KR | 200474461 Y1 | * | 9/2014 | |
| KR | 2018085543 A | * | 7/2018 | F16L 3/221 |
| WO | WO-2020128918 A1 | * | 6/2020 | |

* cited by examiner

WIRING MEMBER SUPPORT DEVICE

CROSS-REFERENCE TO RELATED APPLICATIONS

This application is based on and claims priority to Japanese Patent Application No. 2019-172960 filed on Sep. 24, 2019, the content of which is incorporated herein by reference in its entirety.

TECHNICAL FIELD

The present disclosure relates to a wiring member support device.

BACKGROUND ART

There is a known cable management method in which a cable, which is made to pass through a cylindrical guide hole of a guide member made of tetrafluoroethylene with a gap provided in a radial direction, is guided and held at an intermediate position thereof in a length direction, and the guide member is fixed to a robot body by using a clamp member (for example, see PTL 1).

CITATION LIST

Patent Literature

{PTL 1} Japanese Unexamined Patent Application, Publication No. H8-197482

SUMMARY OF INVENTION

According to one aspect, the present disclosure provides a wiring member support device that supports a movable section of a wiring member provided across two link members that are supported so as to be rotatable about a predetermined axis, the movable section capable of moving in accordance with relative rotation of the link members, the wiring member support device including: two or more support pieces that are provided with at least one guide hole through which an intermediate position of the movable section of the wiring member in the longitudinal direction is made to pass and which has an inner diameter slightly greater than an outer diameter of the wiring member, the two or more support pieces connected so as to be detachable from each other at the position of the guide hole in a radial direction of the guide hole, wherein the wiring member support device is fixed to the link member at a position between a fixed position of the wiring member to the link member and the predetermined axis.

DESCRIPTION OF EMBODIMENTS

A wiring member support device 1 according to an embodiment of the present disclosure will be described below with reference to the drawings.

Figure 1:
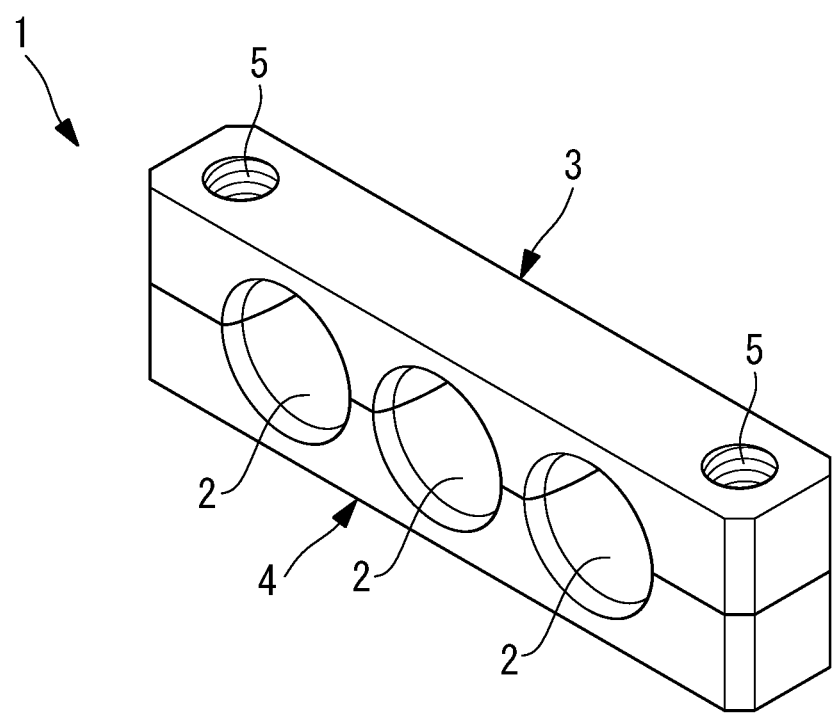
FIG. 1 is a perspective view showing a wiring member support device according to an embodiment of the present disclosure.

As shown in FIG. 1, the wiring member support device 1 of this embodiment is, for example, a flat plate member made of a synthetic resin material having a low friction coefficient, such as tetrafluoroethylene, and a plurality of, for example, three, guide holes 2 that penetrate therethrough in the plate thickness direction are provided arranged in a line.

The wiring member support device 1 is formed by combining two support pieces 3 and 4 that can be separated from each other at a split plane formed of a plane including the central axes of all the guide holes 2. Fixing holes 5 and 6 that extend in a direction perpendicular to the split plane are respectively provided in the support pieces 3 and 4 at both ends of the aligned guide holes 2.

Figure 2:
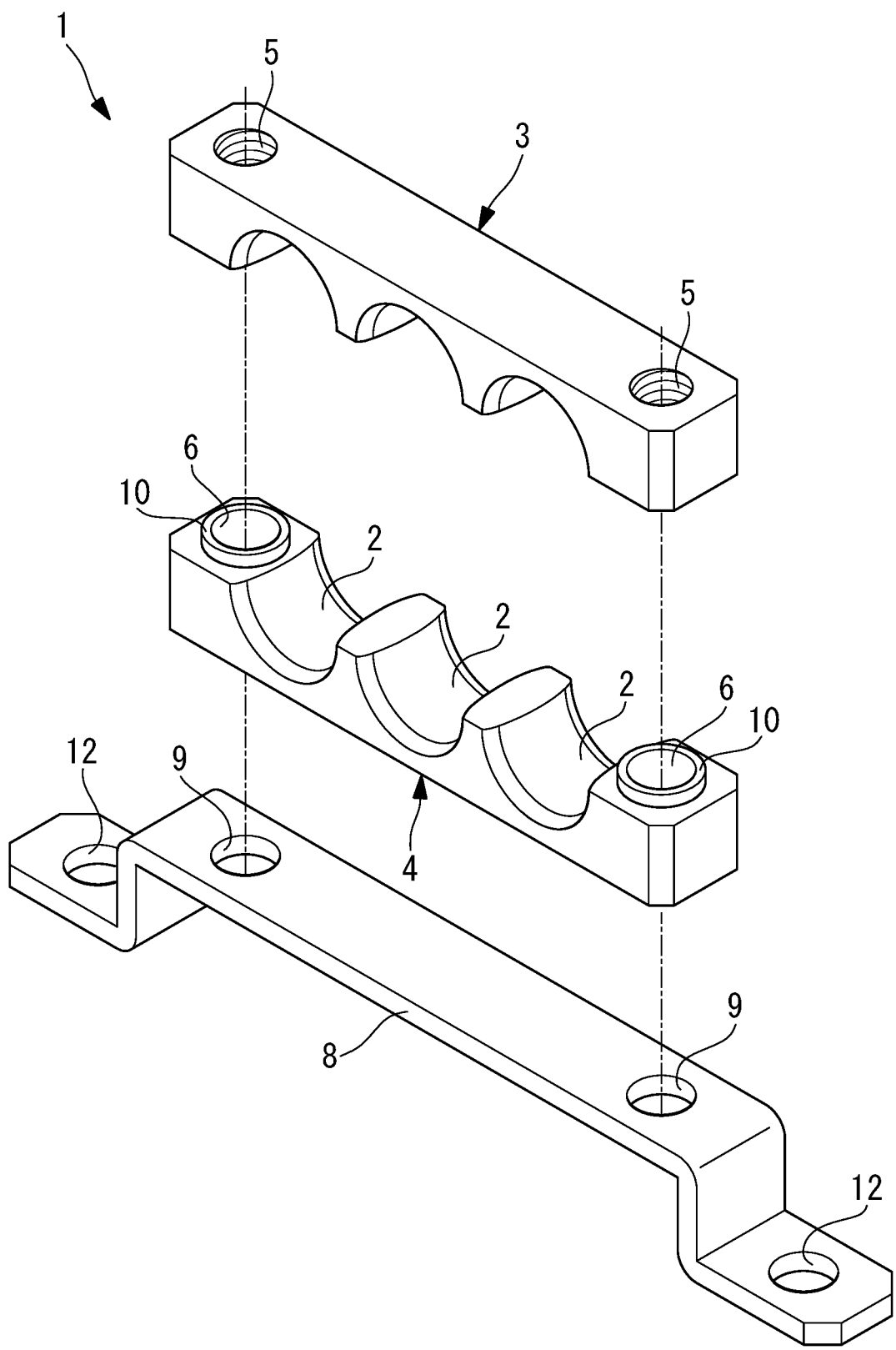
FIG. 2 is an exploded perspective view showing the wiring member support device, which is shown in FIG. 1, and a metal plate member for fixation.
Figure 3:
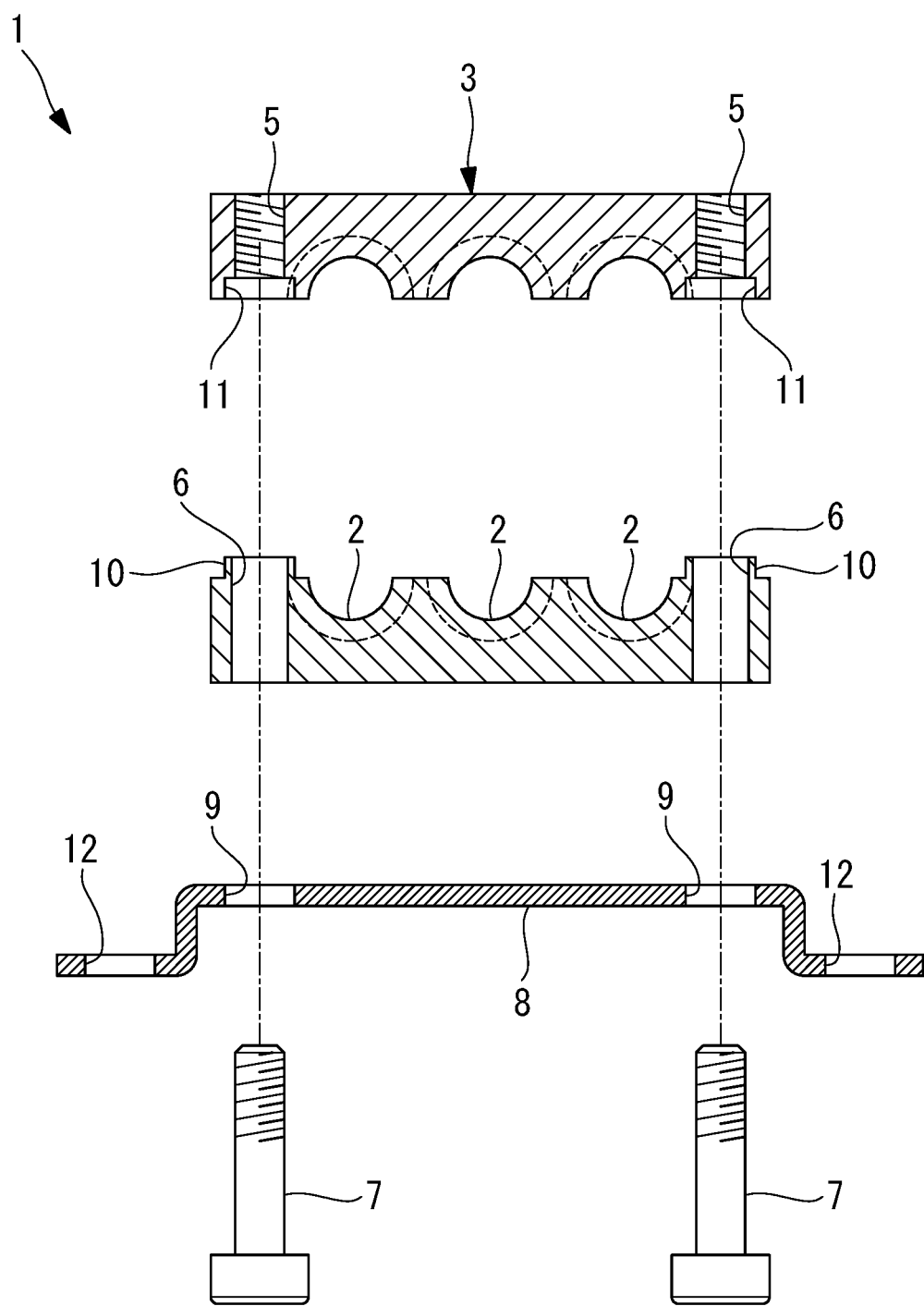
FIG. 3 is an exploded longitudinal sectional view showing the wiring member support device and the metal plate member for fixation, which are shown in FIG. 2, and bolts.
Figure 4:
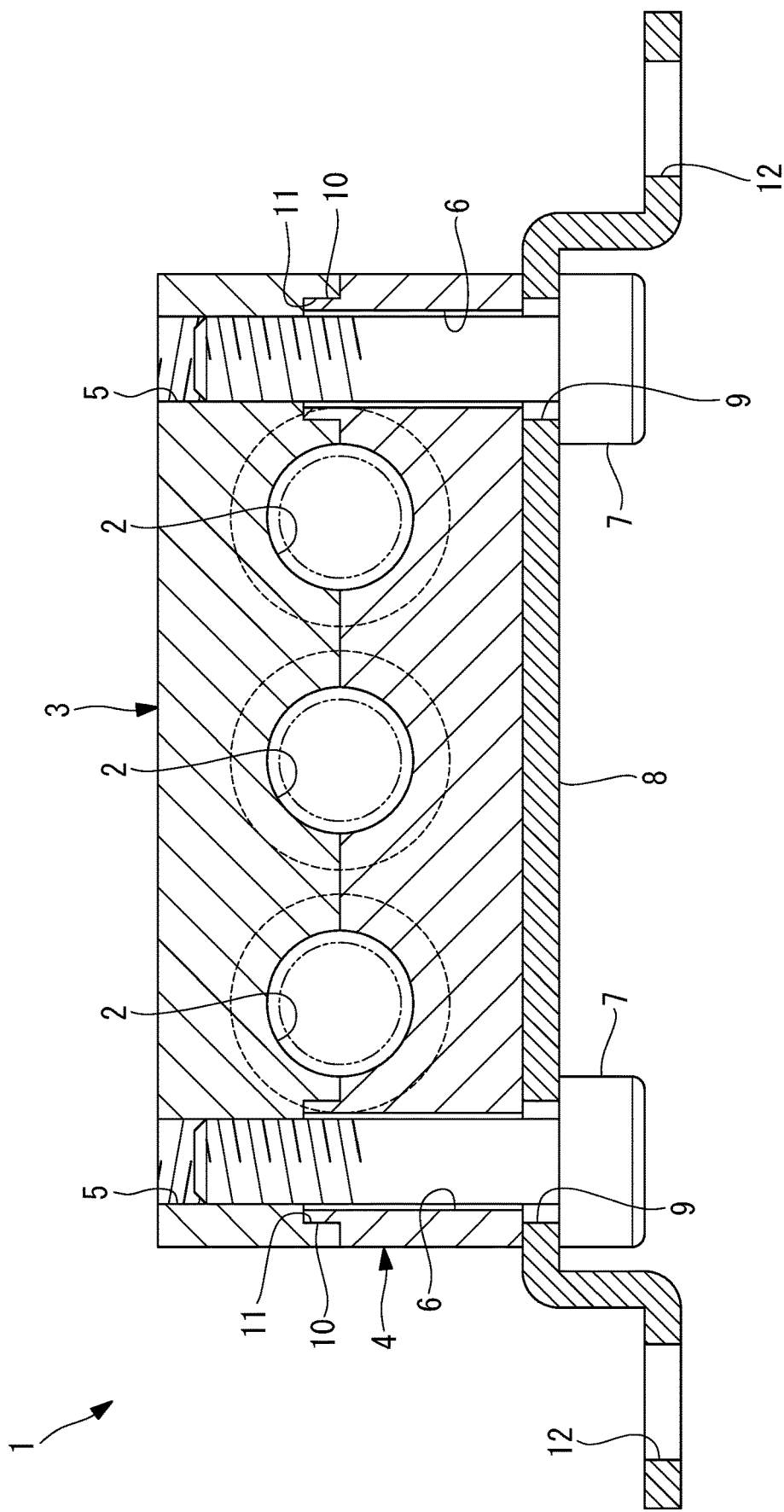
FIG. 4 is a longitudinal sectional view showing a state in which the wiring member support device, the metal plate member, and the bolts, which are shown in FIG. 3, are assembled.

In this embodiment, as shown in FIGS. 2 and 3, female screws are formed in the fixing holes 5 of the one support piece 3. The female screws are, for example, insert screws. As shown in FIG. 4, bolts 7 that are inserted through the fixing holes 6 of the other support piece 4 are screwed into the female screws, thereby making it possible to fix the two support pieces 3 and 4 in a combined state.

More specifically, as shown in FIG. 4, in the two support pieces 3 and 4, in a state in which a metal plate member 8 for fixation is overlaid on the other support piece 4, the bolts 7, which are inserted through through-holes 9 provided in the metal plate member 8 and the fixing holes 6 provided in the other support piece 4, are screwed into the female screws formed in the fixing holes 5 of the one support piece 3. Accordingly, the two support pieces 3 and 4 and the metal plate member 8 are fastened together, so that the metal plate member 8 for fixation is attached to the two support pieces 3 and 4, which are fixed in a combined state.

As shown in FIGS. 3 and 4, fitting recess sections 11 are provided for the fixing holes 5 of the one support piece 3, and fitting convex sections 10 to be fitted into the fitting recess sections 11 are provided for the fixing holes 6 of the other support piece 4. When the two support pieces 3 and 4 are combined, the fitting convex sections 10 are fitted into the fitting recess sections 11, thereby making it possible to combine the support pieces 3 and 4 in a positioned state.

Then, bolts that are inserted through the other through-holes 12 provided in the metal plate member 8 are screwed into screw holes provided in each of link members (see FIGS. 6) 100 and 200, thereby making it possible to fix the wiring member support device 1 to the link members 100 and 200.

Figure 5:
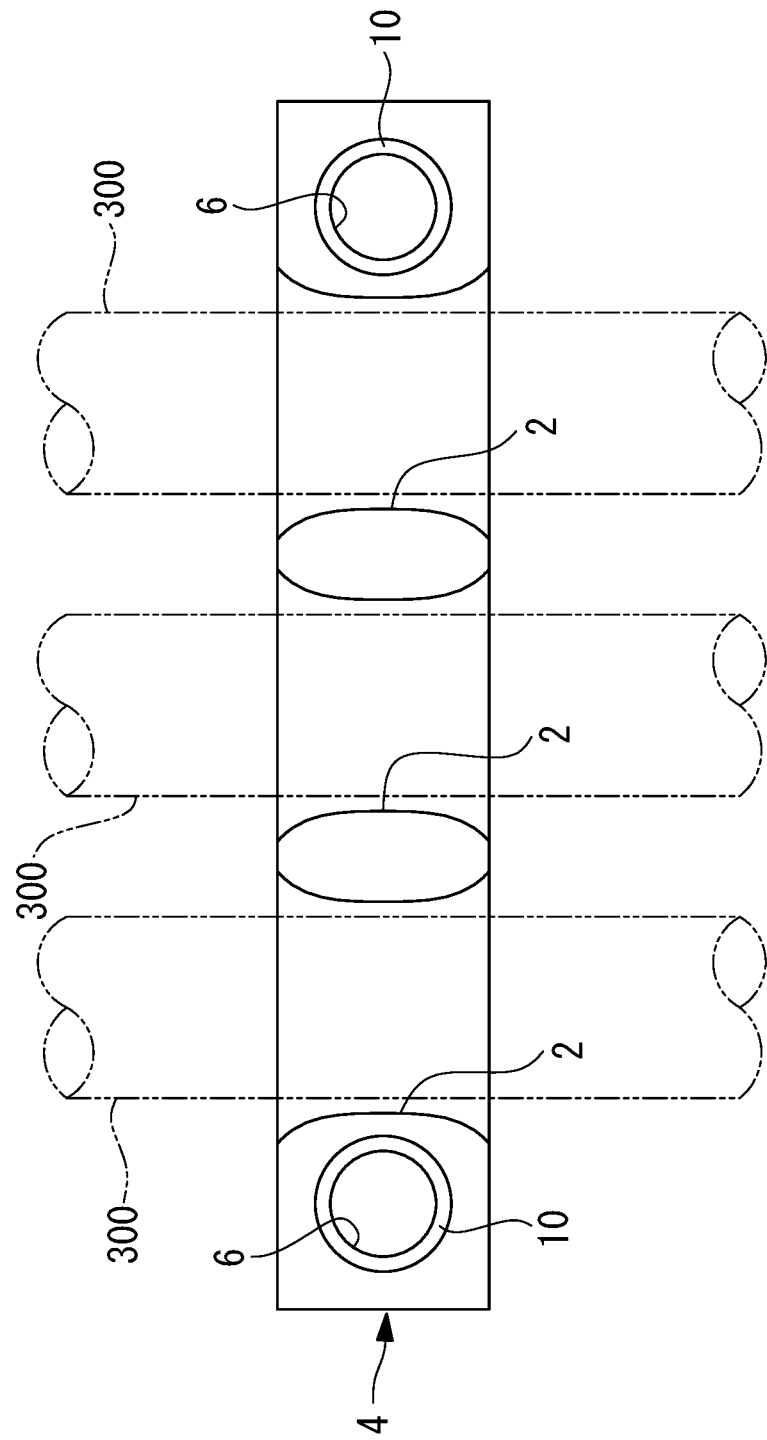
FIG. 5 is a plan view showing the relationship between guide holes of a support piece that constitutes the wiring member support device, which is shown in FIG. 1, and wiring members.

As shown in FIG. 5, an inner surface of each of the guide holes 2 is formed of a smooth curved surface such that an inner diameter of the guide hole 2 is smallest at the center in the axial direction and gradually increases toward both ends.

The inner diameter of each of the guide holes 2 is configured to be slightly greater than an outer diameter of a wiring member 300 that is to pass through, allowing the wiring member 300 to penetrate with gaps provided in the radial directions.

Figure 6:
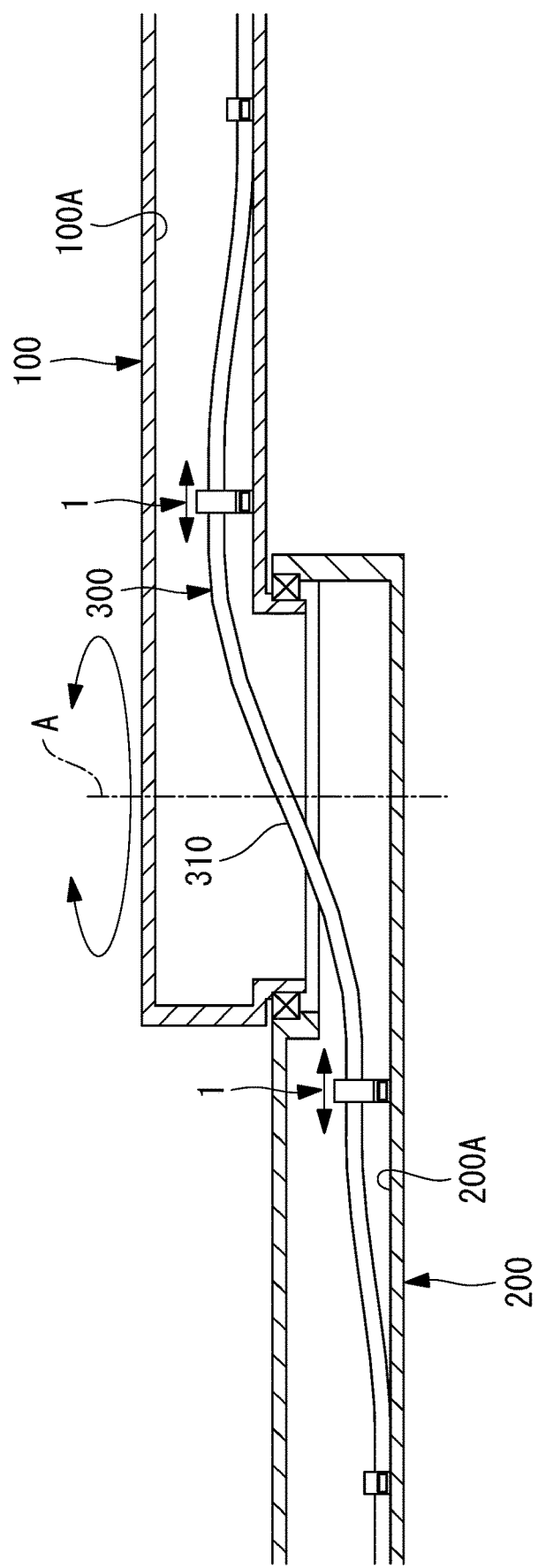
FIG. 6 is a schematic longitudinal sectional view showing a state in which a movable section of a wiring member provided across link members is supported by using the wiring member support device, which is shown in FIG. 1.

The wiring member support device 1 of this embodiment supports a movable section 310 of the wiring member 300 provided across the two link members 100 and 200, which are supported at a joint of a robot so as to be rotatable about a rotation axis (axis) A, the movable section 310 capable of moving in accordance with relative rotation of the link members 100 and 200. As shown in FIG. 6, the wiring member 300 is made to pass through hollow portions 100A and 200A at the position of the rotation axis A in the direction along the rotation axis A, the hollow portions 100A and 200A being provided in the respective link members 100 and 200. The wiring member is fixed at positions sufficiently distant from the rotation axis A, to the two link members 100 and 200 by using clamps or the like.

Then, the wiring member 300 is made to pass through the guide holes 2 of the wiring member support devices 1 of this embodiment, at positions between the rotation axis A and the fixed positions, where the wiring member 300 is fixed to the link members 100 and 200.

Specifically, a section of the wiring member 300 disposed between the fixed positions to the two link members 100 and 200, is the movable section 310, which is moved in accordance with relative rotation of the link members 100 and 200 about the rotation axis A. The wiring member support device 1 of this embodiment is a device for supporting the movable section 310 of the wiring member 300.

The operation of the thus-configured wiring member support device 1 of this embodiment will be described below.

In order to support the wiring members 300 on each of the link members 100 and 200 by using the wiring member support device 1 of this embodiment, the wiring members 300 are disposed in the respective guide holes 2, which are formed by the two support pieces 3 and 4, as shown in FIG. 5, and the two support pieces 3 and 4 and the metal plate member 8 are assembled, as shown in FIGS. 3 and 4. Specifically, the bolts 7, which are inserted through the through-holes 9 of the metal plate member 8 and the fixing holes 6 of the other support piece 4, are screwed into the female screws formed in the fixing holes 5 of the one support piece 3.

Accordingly, the wiring member support device 1 is assembled in a state in which the wiring members 300 are made to pass through the respective guide holes 2, and, as shown in FIG. 6, the bolts that are inserted through the other through-holes 12 of the metal plate member 8 are fastened to screw holes (not shown) of each of the two respective link members 100 and 200. At this time, because each of the wiring members 300 is made to pass through the guide hole 2 with gaps provided therebetween in the radial directions, it is possible to adjust the support position by moving the wiring member support device 1 in the longitudinal direction of the wiring member 300.

Then, both end sections of the wiring member 300 that are disposed, in the link members 100 and 200, on the opposite sides of the respective wiring member support devices 1 from the rotation axis A of the link members 100 and 200 are respectively fixed to the link members 100 and 200 by using clamps. Accordingly, the process for laying the wiring member 300 is completed.

According to the wiring member support device 1 of this embodiment, the wiring member support device 1 is composed of the two support pieces 3 and 4, which have a structure in which the guide holes 2 are split at the split plane. Accordingly, even when members having large outer shapes, such as connectors, are fixed to both ends of the wiring member 300, there is an advantage in that an intermediate position of the wiring member 300 in the length direction can be easily made to pass through the guide hole 2.

In other words, if a cylindrical sleeve is used as in the related art, it is impossible to make members having large outer shapes, such as connectors, pass through the guide hole 2. Therefore, when the wiring member 300 to which connectors or the like have not yet been attached is manufactured, the sleeve needs to be incorporated in the wiring member 300 in advance. As a result, the sleeve cannot be reused when the wiring member 300 is replaced, thus increasing the cost of the wiring member 300.

In contrast to this, according to the wiring member support device 1 of this embodiment, it is possible to continue to reuse the wiring member support device 1 even when the wiring member 300 is replaced.

Then, the wiring member support devices 1 of this embodiment support the movable section 310 of the wiring member 300 at both sides of the movable section 310, with the rotation axis A sandwiched therebetween, while allowing movement in the longitudinal direction and movement in the twisting direction. Accordingly, even if the interval between the fixed positions, at which the clamps are used, is lengthened, it is possible to prevent the movable section 310 from going out of control in accordance with the rotations of the link members 100 and 200.

Specifically, by lengthening the interval between the fixed positions by the clamps, it is possible to lengthen the movable section 310, thus preventing an excessive twist from acting on the wiring member 300, and to prevent the movable section 310 from out of control, thus preventing the wiring member 300 from coming into contact with peripheral members and from being worn away. Furthermore, the support pieces 3 and 4 are made of a low-friction-coefficient material, such as tetrafluoroethylene, thereby making it possible to minimize the wear of the wiring member 300 due to contact.

Furthermore, according to the wiring member support device 1 of this embodiment, the inner surface of the guide hole 2, through which the wiring member 300 is made to pass, is formed into a smooth curved surface shape so that the guide hole 2 is narrowest at the center in the axial direction and widens as it approaches the both-end openings. Accordingly, the contact area of the relatively straight wiring member 300 with the inner surface of the guide hole 2 can be reduced. This structure also can reduce the wear of the wiring member 300. Furthermore, the support pieces 3 and 4 are made of a low-friction-coefficient material, such as tetrafluoroethylene, thereby making it possible to minimize the wear of the wiring member 300 due to contact.

Furthermore, according to the wiring member support device 1 of this embodiment, when the two support pieces 3 and 4 are assembled, the fitting convex sections 10, which are provided on the other support piece 4, are fitted into the fitting recess sections 11, which are provided in the one support piece 3. Accordingly, the two support pieces 3 and 4 can be assembled so as to be mutually positioned, thus making it possible to prevent misalignment of the guide holes 2, to prevent the occurrence of steps on the inner surfaces of the guide holes 2, and to prevent damage to the wiring members 300.

Note that, in this embodiment, although the wiring member support device 1, which includes the three guide holes 2, is shown, instead of this, the wiring member support device 1 may also include a single or an arbitrary number of guide holes 2. Furthermore, although the inner surface of each guide hole 2 is formed into a smooth curved surface shape which has a smallest inner diameter of the guide hole 2 at the center in the axial direction and a diameter of the inner surface gradually increases toward both ends, it is also possible to adopt a guide hole 2 that has a uniform cross-sectional area over the entire length in the axial direction.

Figure 7:
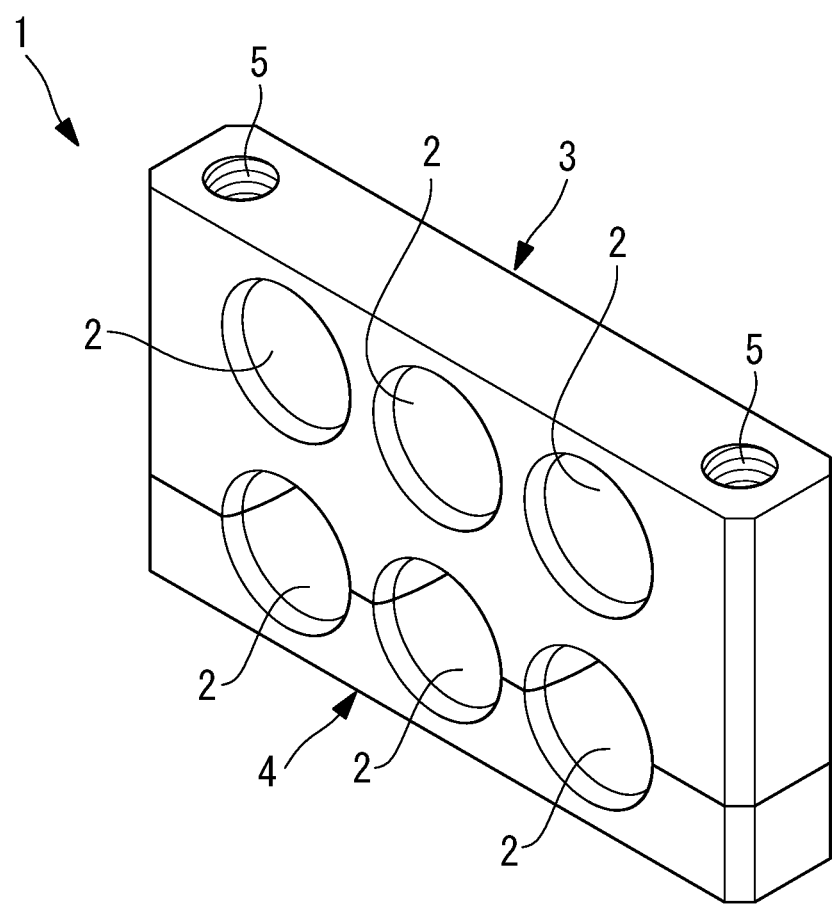
FIG. 7 is a perspective view showing a modification of the wiring member support device, which is shown in FIG. 1.

Furthermore, in this embodiment, although an example case in which the all guide holes 2 are split at the split plane is shown, instead of this, as shown in FIG. 7, some of the guide holes 2 need not be split. For example, a wiring member, such as an air tube, that has a uniform outer-diameter dimension to ends can be made to pass through the guide hole 2 even if the guide hole 2 is not split.

Furthermore, although the two support pieces 3 and 4 are fixed to each of the link members 100 and 200 by using the metal plate member 8, which is fastened together with the two support pieces 3 and 4, the present invention is not limited thereto, and the combined support pieces 3 and 4 may be directly fastened together with each of the link members 100 and 200 with bolts, without providing female screws in the fixing holes 5 and 6 of both the support pieces 3 and 4.

Figure 8:
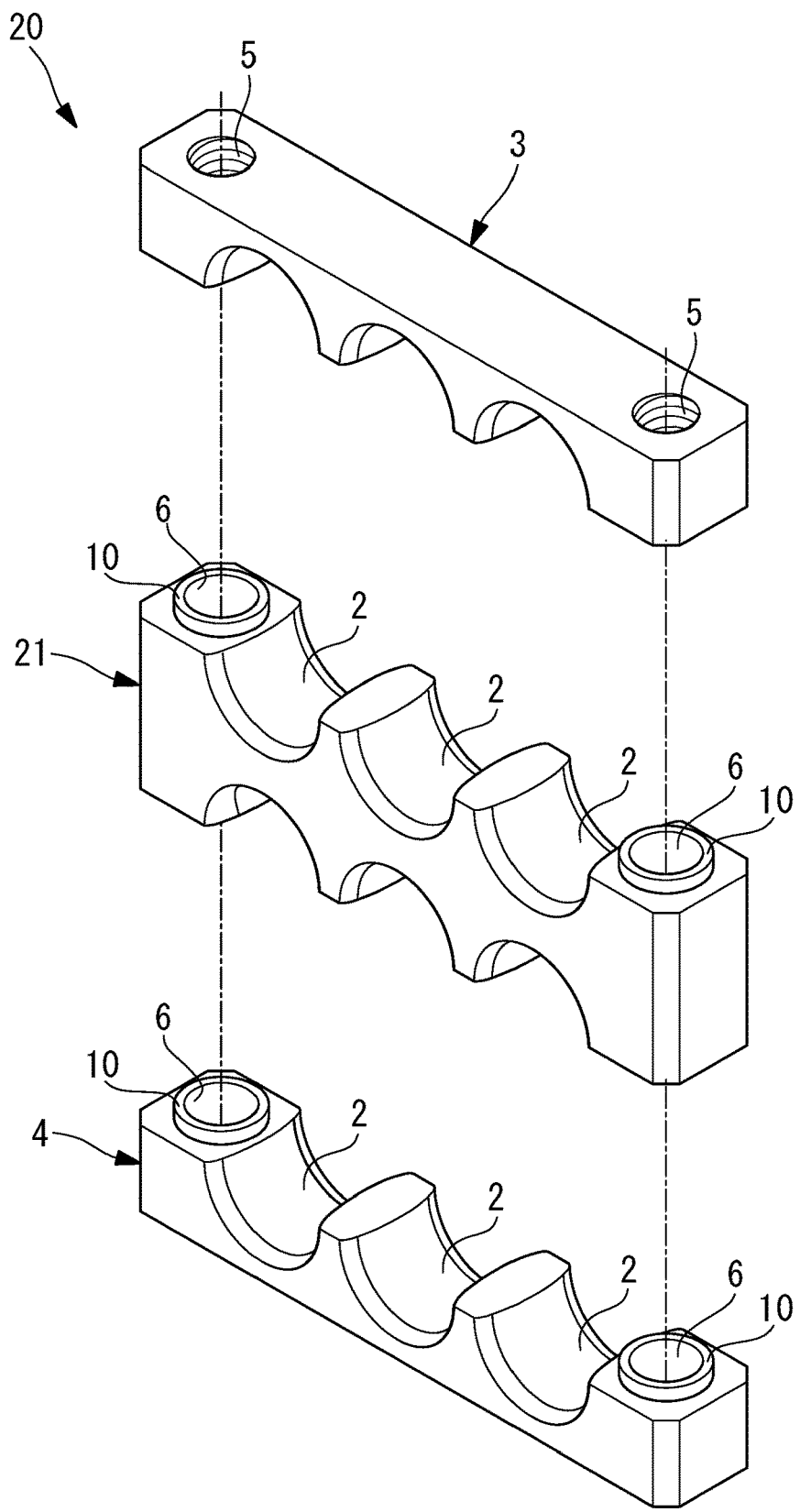
FIG. 8 is an exploded perspective view showing another modification of the wiring member support device, which is shown in FIG. 1.
Figure 9:
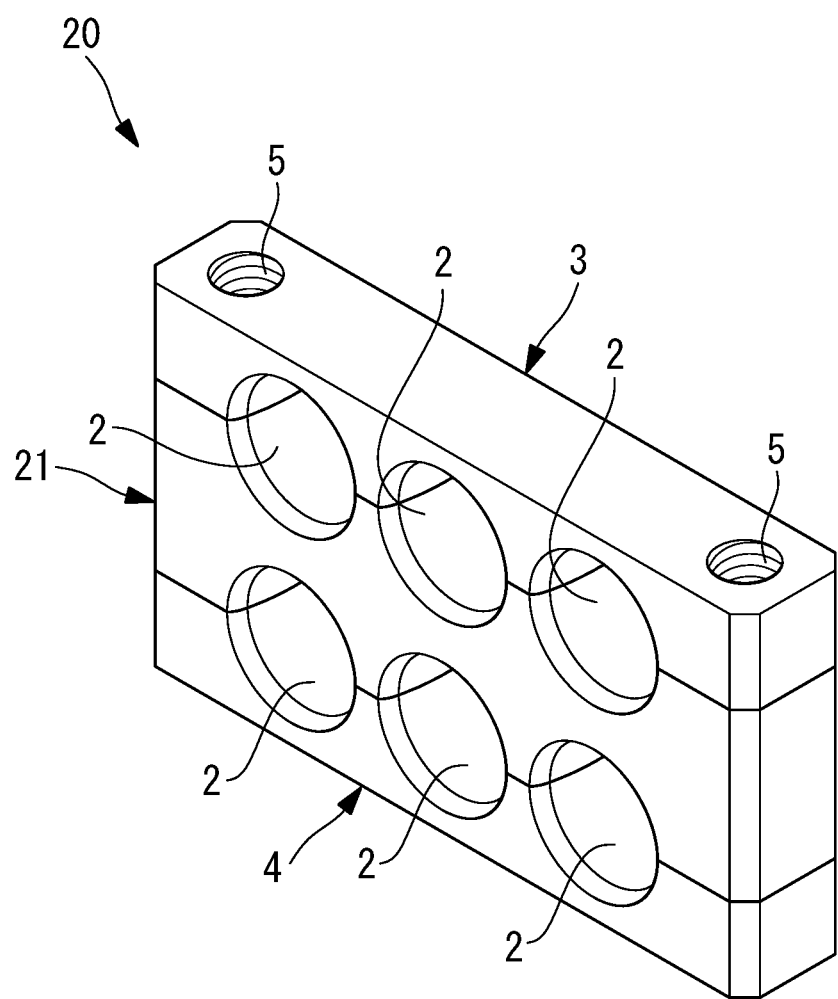
FIG. 9 is a perspective view of a wiring member support device that is shown in FIG. 8.

Furthermore, as shown in FIG. 8, it is also possible to arrange one or more third support pieces (support pieces) 21 between the two support pieces 3 and 4, shown in FIG. 2, thereby forming a wiring member support device 20 that has splittable guide holes 2 in a plurality of rows, as shown in FIG. 9.

Furthermore, the fitting recess sections 11 and the fitting convex sections 10, which are used to position the two support pieces, need not be provided, and another positioning mechanism may be adopted.

REFERENCE SIGNS LIST 1, 20 wiring member support device
2 guide hole
3, 4 support piece
21 third support piece (support piece)
100, 200 link member
300 wiring member
310 movable section
A rotation axis (axis)

The invention claimed is:

1. A wiring member system, the system comprising:
a plurality of wiring members;
two link members, wherein each of the two link members comprises a hollow portion through which the plurality of wiring members run;
wherein a movable section of each of the wiring members is provided across the two link members, the two link members being supported so as to be rotatable about a predetermined axis;
wherein the movable section is adapted to move in accordance with relative rotation of the two link members; and
a wiring member support device comprising:
two or more support pieces that are provided with a plurality of guide holes arranged in a row, the plurality of guide holes through each of which an intermediate position of the movable section of each of the wiring members in the longitudinal direction is made to pass and each of which has an inner diameter slightly greater than an outer diameter of each of the wiring members, the two or more support pieces connected so as to be detachable from each other at a position of the plurality of guide holes in a radial direction of the plurality of guide holes;
wherein the wiring member support device is fixed to each of the two link members at a position between a fixed position of the plurality of wiring members to a link member of the two link members and the predetermined axis; and
wherein the plurality of guide holes are arranged in such a manner that a plane including center axes of the plurality of guide holes is substantially orthogonal to the predetermined axis.

2. The wiring member system according to claim 1, wherein each of the plurality of guide holes has a smooth inner-surface shape which has a smallest inner diameter at an intermediate position of the guide hole in the axial direction and a diameter of the inner surface gradually increases toward both ends in the axial direction.

3. The wiring member system according to claim 1, wherein the two or more support pieces are detachable from each other along a plane including the center axes of all the guide holes.

4. The wiring member system according to claim 1,
wherein the wiring member support device comprises another plurality of guide holes arranged in another row; and
the two or more support pieces are detachable from each other along the center axes of the guide holes in the respective lines.

5. The wiring member system according to claim 1, wherein the support pieces are made of tetrafluoroethylene.

6. A wiring member support device that supports a movable section of each of a plurality of wiring members provided across two link members that are supported so as to be rotatable about a predetermined axis, the movable section capable of moving in accordance with relative rotation of the link members, the wiring member support device comprising:
two or more support pieces that are provided with:
a plurality of guide holes arranged in a row, the plurality of guide holes through which an intermediate position of the movable section of each of the wiring members in the longitudinal direction is made to pass and each of which has an inner diameter slightly greater than an outer diameter of each of the wiring members, the two or more support pieces connected so as to be detachable from each other at a position of the plurality of guide holes in a radial direction of the plurality of guide holes; and
at least one fixing hole that extends in a direction perpdendicular to an axial direction of the plurality of guide holes;
wherein a first support piece of the two or more support pieces has formed therein a fitting recess section;
wherein a second support piece of the two or more support pieces has formed therein a fitting convex section that fits into the fitting recess section;
wherein the wiring member support device is fixed to the link member at a position between a fixed position of the plurality of wiring members to the link member and the predetermined axis;

wherein the plurality of guide holes are arranged in such a manner that a plane including center axes of the plurality of guide holes is substantially orthogonal to the predetermined axis; and wherein each of the two members comprises a hollow portion through which the plurality of wiring members run.

7. A wiring member support device system, the wiring member support device system comprising:

a plurality of wiring members;

two link members, wherein each of the two link members comprises a hollow portion through which the plurality of wiring members run;

wherein a movable section of each of the wiring members is provided across the two link members, the two link members being supported so as to be rotatable about a predetermined axis;

wherein the movable section is adapted to move in accordance with relative rotation of the two link members; and a wiring member support device comprising:

two or more support pieces that are provided with a plurality of guide holes arranged in a row, the plurality of guide holes through each of which an intermediate position of the movable section of each of the wiring members in the longitudinal direction is made to pass and each of which has an inner diameter slightly greater than an outer diameter of each of the wiring members, the two or more support pieces connected so as to be detachable from each other at a position of the plurality of guide holes in a radial direction of the plurality of guide holes;

wherein the wiring member support device supports the movable section at a position between a fixed position of the plurality of wiring members to at least one of the two link members and the predetermined axis; and wherein the plurality of guide holes are arranged in such a manner that a plane including center axes of the plurality of guide holes is substantially orthogonal to the predetermined axis.

* * * * *